United States Patent
Perruchot et al.

(10) Patent No.: US 10,659,717 B2
(45) Date of Patent: May 19, 2020

(54) AIRBORNE OPTOELECTRONIC EQUIPMENT FOR IMAGING, MONITORING AND/OR DESIGNATING TARGETS

(71) Applicant: THALES, Courbevoie (FR)

(72) Inventors: Ludovic Perruchot, Elancourt (FR); Arnaud Beche, Elancourt (FR); Fabien Deprugney, Elancourt (FR); Denis Rabault, Elancourt (FR); Bruno Depardon, Elancourt (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/325,044

(22) PCT Filed: Jul. 9, 2015

(86) PCT No.: PCT/EP2015/065772
§ 371 (c)(1),
(2) Date: Jan. 9, 2017

(87) PCT Pub. No.: WO2016/005535
PCT Pub. Date: Jan. 14, 2016

(65) Prior Publication Data
US 2017/0214879 A1  Jul. 27, 2017

(30) Foreign Application Priority Data
Jul. 11, 2014 (FR) ..................... 14 01558

(51) Int. Cl.
*H04N 5/445* (2011.01)
*G06F 16/58* (2019.01)
(Continued)

(52) U.S. Cl.
CPC ......... *H04N 5/44504* (2013.01); *B64D 43/00* (2013.01); *B64D 47/08* (2013.01);
(Continued)

(58) Field of Classification Search
CPC ... G06T 19/00; G06T 19/006; G06T 2210/16; H04N 13/0239; H04N 13/04
See application file for complete search history.

(56) References Cited

U.S. PATENT DOCUMENTS 6,496,189 B1 * 12/2002 Yaron .................. G06T 15/40
  345/419
7,434,153 B2 * 10/2008 Liu ...................... G06F 3/0481
  715/200
(Continued)

FOREIGN PATENT DOCUMENTS

EP  2 244 150 A2  10/2010

OTHER PUBLICATIONS

Bastia et al. "Interactive Modelling for AR Applications" IEEE International Symposium on Mixed and Augmented Reality 2010 Science and Technology Proceedings Oct. 13-16, 2010 Seoul, Korea.*

(Continued)

*Primary Examiner* — Frank F Huang
(74) *Attorney, Agent, or Firm* — Baker & Hostetler LLP

(57) ABSTRACT

An airborne optronic equipment item comprises: at least one image sensor suitable for acquiring a plurality of images of a region flown over by a carrier of the equipment item; and a data processor configured or programmed to receive at least one acquired image and transmit it to a display device; wherein the data processor is also configured or programmed to: access a database of images of the region flown over; extract from the database information to synthesize a virtual image of the region which would be seen by an observer situated at a predefined observation point and looking, with a predefined field of view, along a predefined (Continued)

Figure 1:
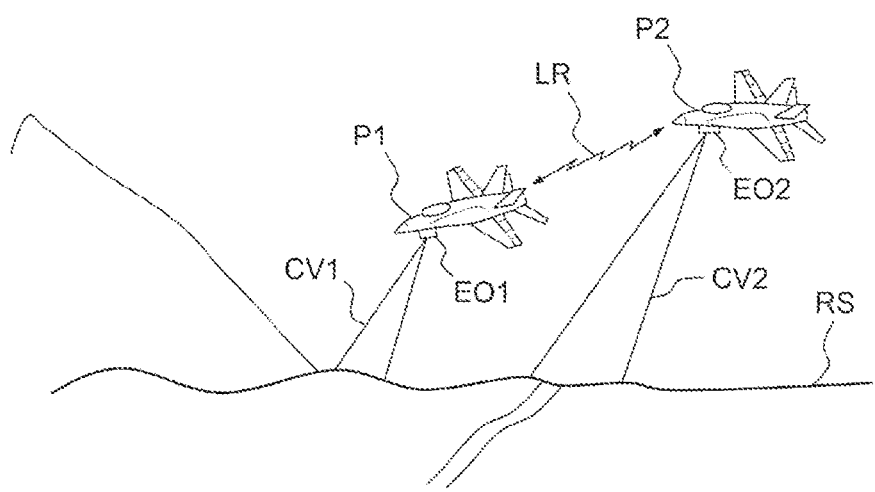

line of sight; synthesize the virtual image; and transmit it to a display device. A method for using such an equipment item is provided.

13 Claims, 4 Drawing Sheets

(51) Int. Cl.
*B64D 43/00* (2006.01)
*G06T 19/00* (2011.01)
*B64D 47/08* (2006.01)
*H04N 7/18* (2006.01)

(52) U.S. Cl.
CPC ........ *G06F 16/5866* (2019.01); *G06T 19/006* (2013.01); *H04N 7/185* (2013.01)

(56) References Cited

U.S. PATENT DOCUMENTS

| | | | | |
|---|---|---|---|---|
| 2005/0134683 A1* | 6/2005 | Quintana | ............... | G06F 1/163 348/61 |
| 2010/0080466 A1* | 4/2010 | Chen | ............... | G06T 17/05 382/195 |
| 2010/0295960 A1* | 11/2010 | Furlan | ............... | H01R 13/6683 348/222.1 |
| 2010/0309288 A1* | 12/2010 | Stettner | ............... | G01S 17/023 348/43 |
| 2010/0319235 A1* | 12/2010 | Panaro | ............... | A01K 97/00 43/26.1 |
| 2011/0004059 A1* | 1/2011 | Arneson | ............... | A61B 1/00041 600/109 |
| 2011/0032483 A1* | 2/2011 | Hruska | ............... | G02B 26/008 353/8 |
| 2011/0109719 A1* | 5/2011 | Wilson | ............... | G01C 11/02 348/42 |
| 2011/0169778 A1* | 7/2011 | Nungester | ............... | G06F 3/03542 345/175 |
| 2012/0019659 A1* | 1/2012 | Warzelhan | ............... | G08B 13/19615 348/143 |
| 2012/0113228 A1* | 5/2012 | Konno | ............... | H04N 13/0452 348/47 |
| 2012/0242560 A1* | 9/2012 | Nakada | ............... | G09G 3/3406 345/8 |
| 2012/0287241 A1* | 11/2012 | Foord | ............... | H04N 21/2187 348/46 |
| 2014/0085462 A1* | 3/2014 | Karlov | ............... | G06T 7/208 348/143 |
| 2014/0160285 A1* | 6/2014 | Barrou | ............... | B64D 11/0015 348/144 |
| 2014/0247325 A1* | 9/2014 | Wu | ............... | H04N 5/23206 348/39 |
| 2016/0082840 A1* | 3/2016 | Yoshida | ............... | B60K 35/00 701/36 |

OTHER PUBLICATIONS

Hollerer et al., "Chapter 9: Mobile Augmented Reality," Telegeoinformatics: Location-Based Computing and Services, Jan. 31, 2004, pp. 221-260, XP007912968.
Livingston et al., "Military Applications of Augmented Reality," Handbook of Augmented Reality, Jan. 1, 2011, pp. 671-706, XP055196470.
Pasman et al., "Accurate overlaying for mobile augmented reality," Computers and Graphics, vol. 23, No. 6, Dec. 1, 1999, pp. 875-881, XP004187839.
Azuma, "A Survey of Augmented Reality," Presence: Teleoperators and Virtual Enviroments, vol. 6, No. 4, Aug. 1, 1997, pp. 355-385, XP055178317.
Wu, et al., "Visor-based auxiliary navigation method using augmented reality for unmanned aerial vehicles", IEEE 10th International Conference on Industrial Informatics, pp. 520-525, Jul. 2012.
European Search Report issued in European Patent Application No. 15 736 827.5 dated Jun. 3, 2019.

* cited by examiner

AIRBORNE OPTOELECTRONIC EQUIPMENT FOR IMAGING, MONITORING AND/OR DESIGNATING TARGETS

The invention relates to an airborne optronic equipment item that can be called "permanent vision equipment item", for imaging, monitoring and/or designating targets such as, for example, a laser designation "pod". The invention relates also to a method implemented by means of such an optronic equipment item.

An optronic equipment item for imaging, monitoring and/or designating targets with which a carrier (generally an aircraft) is equipped comprises one or more image sensors which make it possible to acquire images of a region flown over by the carrier. At least one of these images is displayed on a screen to allow the operator to perform various types of missions: reconnaissance 2nd monitoring to analyze an area and seek and identify particular elements; attack for positioning and designating surface or airborne targets; or navigation by facilitating flight in difficult conditions, at night or in poor weather ("FLIR", or "Forward-Looking InfraRed" mode). If said equipment item is a designation "pod", it also comprises a laser source and a beam forming system suitable for directing a laser beam to a target previously identified by an operator on an image acquired by said sensor and displayed by one said screen.

These equipment items, known from the prior art, exhibit a certain number of drawbacks:

in detection/designation mode, the field of the image is very small, which makes it difficult for the operator to establish the link between the image supplied by the optronic equipment item and what he or she themself sees on the ground (the term "straw effect" is used, because it is as if the operator were looking through a straw);

the visibility can be compromised by the weather conditions (clouds, fog, etc.) or the presence of smoke, even because of a masking by the carrier or the body of the optronic equipment item itself;

infrared imaging exhibits a relatively low resolution and monochrome images, whereas color can be an important piece of information, for example for recognizing a target;

the FLIR and detection modes can be mutually exclusive;

collaborative missions can demand the display of images acquired by another optronic equipment item, embedded on another carrier; that requires a high bit rate data link for the transmission of the data, which is not always available.

The invention aims to overcome at least some of these drawbacks. For this, it proposes using, in addition to "real" image sensors, what can be qualified as a "virtual sensor". The latter comprises data processing means cooperating with a geolocated terrain database to generate "virtual" images intended to accompany, enrich or replace the "real" images acquired by the sensors.

The data processing means of the "virtual sensor" can be purely software. In this case, it will involve one or more software modules intended to be executed by a data processor which also ensures the other functionalities of the optronic equipment item. They can be purely hardware: in this case, one or more dedicated—preferably digital—circuits will be involved. Finally, they can be hybrid, combining software modules and dedicated circuits. The database can be local, in which case it is stored in a mass memory (for example a solid-state drive) located on the carrier or in the optronic equipment item, or be remotely accessible via a radio link.

A subject of the invention is therefore an airborne optronic equipment item comprising:

at least one image sensor, suitable for acquiring a plurality of images of a region flown over by a carrier of said equipment item; and a data processor configured or programmed to receive at least one said acquired image and transmit it to a display device;

characterized in that said data processor is also configured or programmed to:

access a database of images of said region flown over;

extract from said database information making it possible to synthesize a virtual image of said region which would be seen by an observer situated at a predefined observation point and looking, with a predefined field of view, along a predefined line of sight;

synthesize said virtual image; and transmit it to said or to another display device.

According to different embodiments of such an optronic equipment item:

Said database can comprise at least: a numerical model of the terrain of said region; and a plurality of ortho-rectified air or satellite images or SAR of said region, said images being geolocated; said data processor being configured or programmed to synthesize said virtual image by projection of one or more of said air or satellite images onto said numerical model of the terrain.

Said database can also comprise vector mapping data, said data processor being configured or programmed to incorporate some of said data in said virtual image.

Said data processor can be configured or programmed to enrich said database with images acquired by said or at least one said image sensor.

Said data processor can be configured or programmed to receive, from a geolocation device, information on the position of said carrier of the equipment item or of another carrier, as well as information indicative of a line of sight of an image sensor embedded on this carrier, and to synthesize a virtual image corresponding to said line of sight and to an observation point having the same position as said carrier. More particularly, said data processor can be configured or programmed to display said virtual image in place of an image acquired by said embedded image sensor in case of masking or insufficient visibility. As a variant or in addition, said data processor can be configured or programmed to merge said virtual image and an image acquired by said embedded image sensor with a same line of sight and a same field of view. Also as a variant or in addition, said data processor can be configured or programmed to synthesize one said virtual image, having a same observation point and a same line of sight as an image acquired by said embedded image sensor, but a wider field of view, and to insert said image acquired by said embedded image sensor in said virtual image. Similarly, said data processor can be configured or programmed to synthesize a plurality of said virtual images corresponding to points of view close to the position of an image sensor embedded on said carrier, as determined by said geolocation device, and to recompute said position by correlation between an image acquired by said sensor and said virtual images. Said data processor can also be configured or programmed to: receive, from said or at least one said image sensor, embedded on said carrier of the equipment item, at least one image of said region flown over by a carrier of said equipment item, and display it on a first display device embedded on the same carrier; receive, from another carrier, information on the position of said carrier, as well as on the line of sight and the field of view of at least one image sensor embedded on said other carrier; synthesize a virtual image corresponding to said line of sight and to an observation point having said position, and display it on a second display device distinct from said first display device and embedded on said carrier of the equipment item.

The optronic equipment item can also comprise an embedded data storage device in which said database is stored.

Said data processor can be configured or programmed to drive said or at least one said image sensor for it to acquire at least one said image of said region flown over according to a line of sight and with a field of view that are defined.

Said optronic equipment item can be an airborne optronic equipment item for designating targets.

Another subject of the invention is a method implemented by an optronic equipment item as claimed in one of the preceding claims, comprising the following steps:

receiving, from a geolocation device, information on the position of the carrier of the equipment item or of another carrier, as well as information indicative of a line of sight of an image sensor embedded on this carrier;

accessing a database of images of said region flown over and extracting therefrom information making it possible to synthesize a virtual image corresponding to said line of sight and to an observation point having the same position as said carrier;

synthesizing said virtual image; and transmitting it to a display device.

Figure 2:
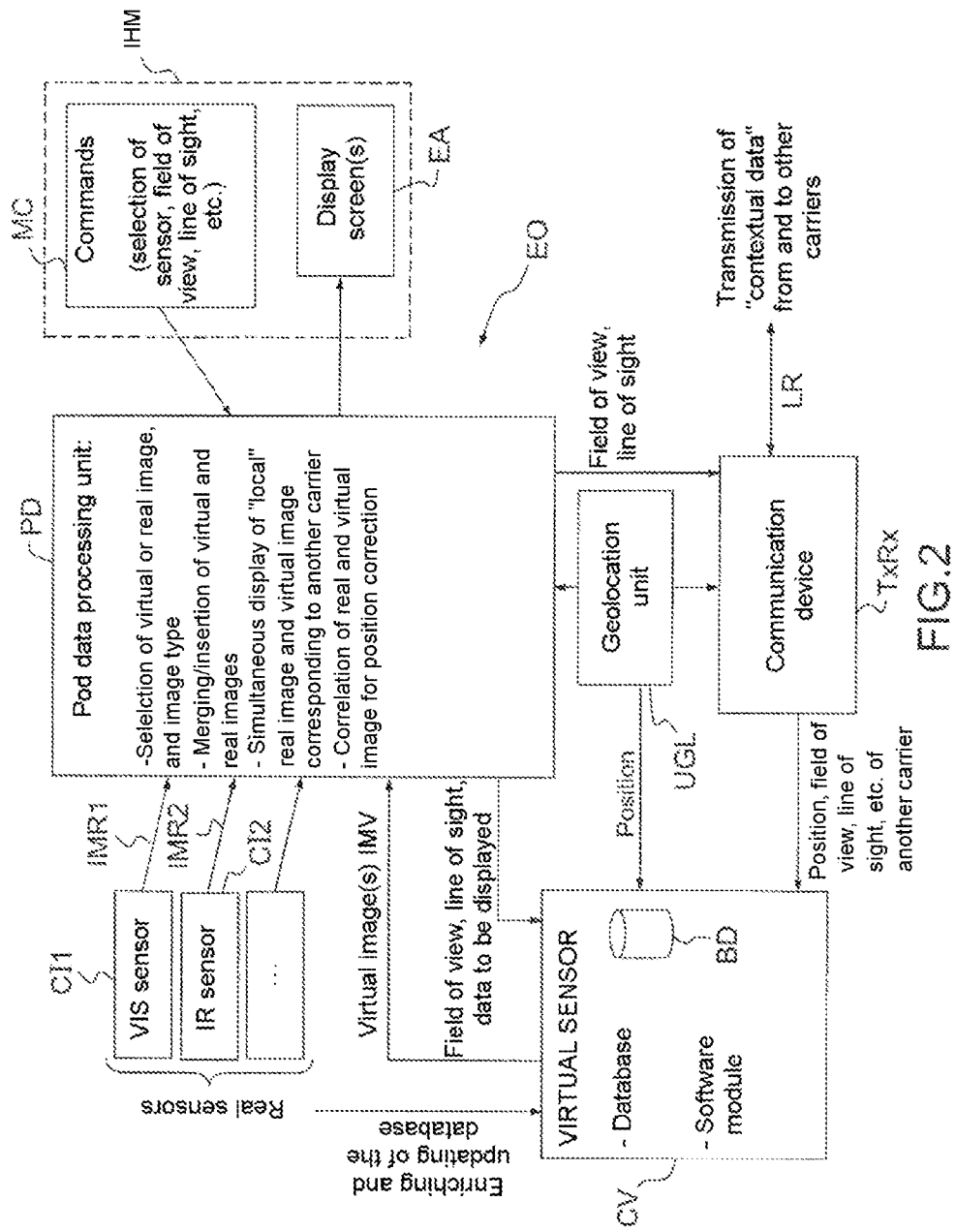
Figure 3:
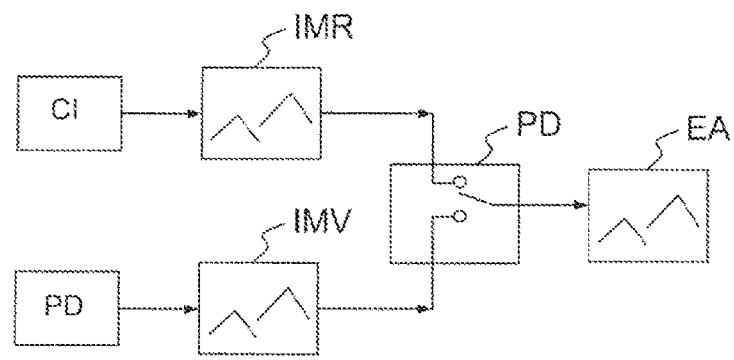
Figure 4:
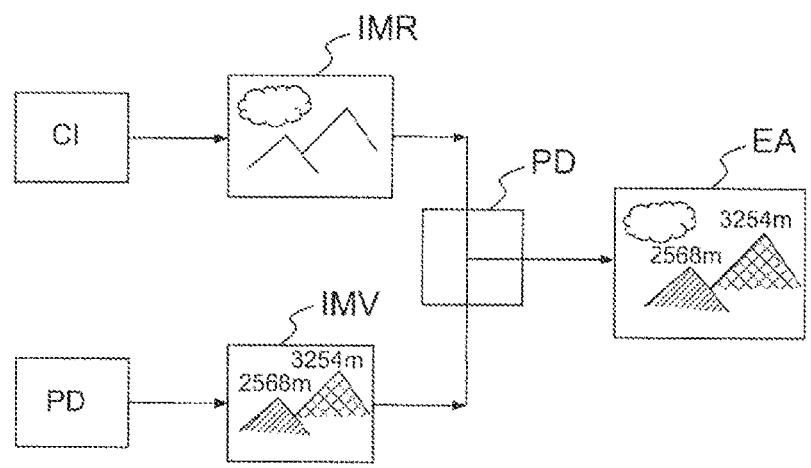
Figure 5:
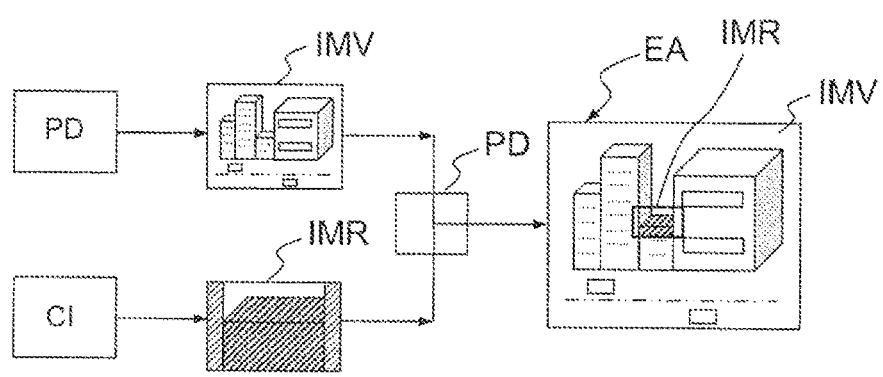
Figure 6:
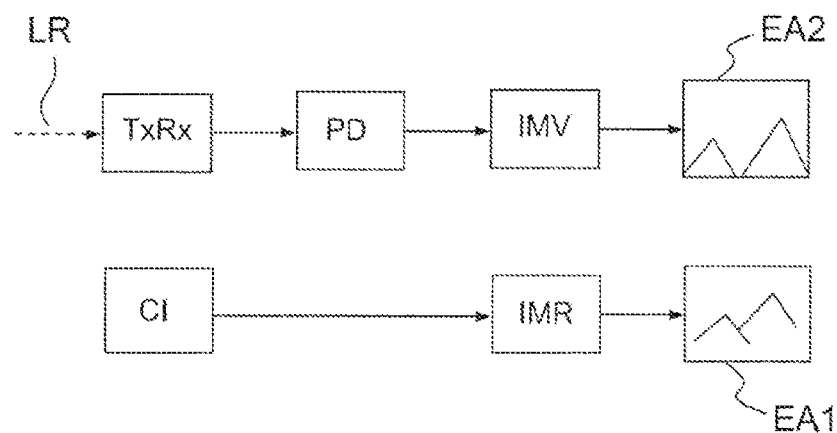
Figure 7:
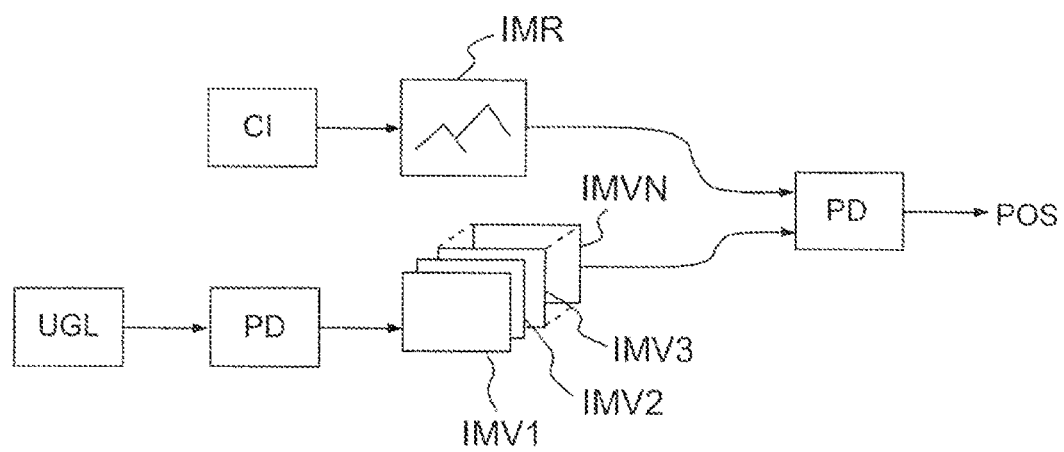

Other features, details and advantages of the invention will become apparent on reading the description given with reference to the attached drawings given by way of example and which represent, respectively:

FIG. 1, two fighter airplanes flying over a region, communicating by a radio link and each carrying an optronic equipment item according to an embodiment of the invention;

FIG. 2, a functional diagram of an optronic equipment item according to an embodiment of the invention;

FIG. 3, the use of an optronic equipment item according to an embodiment of the invention to display, alternately, a real image or a virtual image;

FIG. 4, the use of an optronic equipment item according to an embodiment of the invention for displaying a real image and a virtual image that are merged;

FIG. 5, the use of an optronic equipment item according to an embodiment of the invention for displaying a real image inserted into a virtual image with a wider field of view;

FIG. 6, the use of an optronic equipment item according to an embodiment of the invention for simultaneously displaying a real image and a virtual image corresponding to a different observation point in the context of a cooperative mission; and FIG. 7, the use of an optronic equipment item according to an embodiment of the invention for performing a carrier position correction operation by image correlation.

FIG. 1 illustrates a context of use of an optronic equipment item according to the invention. It represents two fighter airplanes (carriers) P1 and P2, each equipped with an optronic equipment item EO1, EO2 according to an embodiment of the invention. These equipment items comprise image sensors observing a region RS flown over by the carriers with respective fields of view CV1, CV2. The two carriers—and, if necessary, their optronic equipment items—communicate via a data radio link LR, enabling them to perform a collaborative mission.

FIG. 2 shows a functional diagram of an optronic equipment item EO according to an embodiment of the invention, or of just its "imaging" part (the target designation means, which may be present, are not represented). Conventionally, this equipment item comprises three main parts:

One or more image sensors, for example a camera operating in the visible part of the spectrum, CI1, and an infrared camera CI2. The references IMR1 and IMR2 indicate the images (called "real images" hereinbelow) acquired by these sensors, or, to be more precise, the digital data representing these images, conveyed by electronic signals.

A human-machine interface IHM, comprising one or more display screens EA and/or other display devices such as head-up visors, allowing an operator to view images, as well as control means MC (buttons, keyboards, touchscreens, etc.) enabling said operator to enter commands and operating parameters of the equipment item. For example, the control means MC can allow the operator to select an image sensor, its orientation and its field of view, and the screen EA displays in real time the images acquired by this sensor.

A data processor PD, comprising one or more computers and/or dedicated electronic circuits. The data processor drives actuators ensuring the orientation, the focusing and the setting of the image sensors CI1, CI2 in accordance with the commands entered by the operator: it receives the images IMR1, IMR2 acquired by these sensors, if necessary performs various processes on these images and ensures the display thereof by the screen or the screens EA.

Still conventionally, the optronic equipment item EO also comprises a geolocation unit UGL, of AHRS (Attitude and heading reference system) type making it possible to determine the position of the carrier and the precise position of the line of sight, possibly exploiting the data from a GNSS (Global Navigation Satellite System) system and/or the inertial data originating from the unit of the carrier, and a communication device TxRx making it possible to transmit and receive data via the radio link LR. In a variant, the geolocation unit and/or the communication device can be external to the optronic equipment item, and configured to communicate therewith.

The optronic equipment item EO also comprises a virtual sensor which, in the embodiment of FIG. 2, consists of a database BD stored in an embedded mass memory and by a software module executed by the data processor PD. As mentioned above, other embodiments can be envisaged: for example, the database can be accessible remotely instead of being embedded and the software module can be replaced wholly or partly by dedicated electronic circuits forming part of the data processor.

The database BD contains a numerical model of the terrain of the region RS flown over by the carrier, typically of DTED type, and a plurality of geolocated images of said region. The images can have different origins; they can in particular be:

ortho-rectified satellite images;

ortho-rectified multispectral air reconnaissance images;

images acquired previously by the optronic equipment item itself, or by other airborne optronic equipment items;

SAR (synthetic aperture radar) images.

The database can also contain geographic vector data, generally of VMAP type: road and rail network, hydrological system, place names, etc.

It is important to note that the optronic equipment item can in real time enrich the database with the images that it acquires during each mission. Thus, it will be possible to ensure the "freshness" of the data stored in the base.

The software module receives as input the following information:

a position, which can be the position of the carrier determined by the geolocation unit UGL, the position of another carrier, received via the communication device TxRx, or an arbitrary position;

a line of sight, which can be colinear to that of one of the "real" sensors of the optronic equipment item—or to that of a sensor of such an equipment item of another carrier, or else be controlled by the pilot or by an external setpoint;

a desired field of view, which can correspond to that of one of the "real" sensors of the optronic equipment item—or to that of a sensor of such an equipment item of another carrier, or else be arbitrary; and optionally, a list of the geographic information to be displayed (names of roads, places, etc.).

From this information and information (numerical model, images) stored in the database, the software module generates a virtual image IMV, which corresponds to the image which would be acquired by a real sensor having the position, orientation (line of sight) and the field of view desired. Typically, the virtual image is generated or synthesized by projection of one or more of the images from the database onto said numerical model of the terrain. The computer techniques that allow for the synthesis of such a virtual image are well known to those skilled in the art.

It is possible to envisage several different uses of the virtual image thus obtained. Some of them will be described hereinbelow, with reference to FIGS. 3 to 7.

As illustrated in FIG. 3, the data processor PD can select, for display on the screen EA, either a real image IMR, or a virtual image IMV corresponding to the same observation point (or point of view), to the same line of sight and to the same field of view. The choice of the image to be displayed can be made by the operator, or automatically by the data processor, for example if there is masking of the real image.

As illustrated in FIG. 4, the data processor PD can merge a real image IMR and a virtual image IMV corresponding to the same observation point, to the same line of sight and to the same field of view to create an enriched image, in accordance with the "augmented reality", which is displayed on the screen EA. In the example of FIG. 4, the virtual image contains color information (represented, in the figure, by shadings) which is absent from the real image IMR, as well as geographic information (height of two mountains); on the other hand, only the real image IMR makes it possible to view an ephemeral phenomenon, in this case the presence of a cloud. The enriched image makes it possible to display all this information at the same time.

A real image IMR with small field of view can also be inserted into a virtual image IMV with wide field of view to avoid the abovementioned "straw effect". This situation is illustrated in FIG. 5 where the real image IMR, showing a building in an urban environment, is inserted into a virtual image IMV with wider field of view in order to be placed in its context (road lanes, other buildings serving as references, etc.). Obviously, the virtual image could also display geographic data making it easier to identify the building—which could, in a military application, be a target to be designated. If necessary, the image with small field of view inserted into the virtual image with wider field of view could be an enriched image, obtained by merging of a real image and of a virtual image (see FIG. 4).

FIG. 6 shows an application in which a real image IMR, acquired by a sensor CI of the optronic equipment item, is displayed on a first screen EA1. At the same time, a virtual image IMV is displayed on a second screen EA2 or on the same screen by switching or by insertion; this virtual image corresponds to the observation point, to the line of sight and to the field of view of an image sensor of the optronic equipment item of another carrier (if necessary, it can even be a virtual sensor, this variant being able to be used in particular for training purposes), these data being received by the communication device TxRx. In return, the communication device could be used to transmit data of the same type to an optronic equipment item embedded on said other carrier. In the context of the cooperative mission of FIG. 1, this application allows the pilot of the airplane P1 to see what the pilot of P2 sees, and vice-versa. It will be noted that, contrary to the prior art, that does not require a high bit rate link. In effect, it is not necessary to transmit images from one carrier to another, but only "contextual data" (position, line of sight, setting parameters of the image sensor or sensors) allowing for the synthesis of a virtual image.

The optronic equipment item can also be used to refine or correct a position determined by a geolocation unit UGL. As illustrated in FIG. 7, the geolocation unit determines a first estimation of the position of an image sensor embedded on said sensor, and the data processor PD synthesizes a plurality of virtual images IMV1, IMV2, VI3 . . . IMVN corresponding to observation points close to this estimated position (that is to say surrounding said position and situated within a radius defined around it) and with a defined line of sight. Said image sensor acquires a real image IMR with the same line of sight. Then, the data processor determines a new position estimation by correlation between the real image and the virtual images.

Other applications of the optronic equipment item according to the invention will be able to be envisaged without departing from the scope of the present invention.

The invention claimed is:

1. An airborne optronic equipment item comprising:
   at least one image sensor suitable for acquiring a plurality of images of a region flown over by a carrier of said equipment item; and
   a data processor configured or programmed to:
      receive at least one of said acquired images and transmit said at least one acquired image to a display device;
      access a database of images of said region flown over from a source other than the at least one image sensor, said database comprising a numerical model of terrain of said region, and a plurality of ortho-rectified air or satellite images or SAR of said region, said images being geolocated;
      extract from said database information making it possible to synthesize a virtual image of said region which would be seen by an observer situated at a predefined observation point and looking, with a predefined field of view, along a predefined line of sight;
      synthesize said virtual image by projection of one or more of said ortho-rectified air or satellite images onto said numerical model of the terrain; and
      transmit said virtual image to said or to another display device.

2. The airborne optronic equipment item as claimed in claim 1, wherein said database also comprises vector mapping data, and wherein said data processor is configured or programmed to incorporate some of said data in said virtual image.

3. The airborne optronic equipment item as claimed in claim 1, wherein said data processor is configured or programmed to enrich said database with images acquired by said or at least one said image sensor.

4. The airborne optronic equipment item as claimed in claim 1, wherein said data processor is configured or programmed to receive, from a geolocation device, information on the position of said carrier of the equipment item or of another carrier, as well as information indicative of a line of sight of an image sensor embedded on this carrier, and to synthesize a virtual image corresponding to said line of sight and to an observation point having the same position as said carrier.

5. The airborne optronic equipment item as claimed in claim 4, wherein said data processor is configured or programmed to display said virtual image in place of an image acquired by said embedded image sensor in case of masking or insufficient visibility.

6. The airborne optronic equipment item as claimed in claim 4, wherein said data processor is configured or programmed to merge said virtual image and an image acquired by said embedded image sensor with a same line of sight and a same field of view.

7. The airborne optronic equipment item as claimed in claim 4, wherein said data processor is configured or programmed to synthesize one said virtual image, having a same observation point and a same line of sight as an image acquired by said embedded image sensor, but a wider field of view, and to insert said image acquired by said embedded image sensor in said virtual image.

8. The airborne optronic equipment item as claimed in claim 4, wherein said data processor is configured or programmed to synthesize a plurality of said virtual images corresponding to points of view close to the position of an image sensor embedded on said carrier, as determined by said geolocation device, and to recompute said position by correlation between an image acquired by said sensor and said virtual images.

9. The airborne optronic equipment item as claimed in claim 4, wherein said data processor is configured or programmed to:
receive, from said or at least one said image sensor, embedded on said carrier of the equipment item, at least one image of said region flown over by a carrier of said equipment item, and display said at least one image on a first display device embedded on the same carrier;
receive, from another carrier, information on the position of said carrier, as well as on the line of sight and the field of view of at least one image sensor embedded on said other carrier;
synthesize a virtual image corresponding to said line of sight and to an observation point having said position, and display said virtual image on a second display device distinct from said first display device and embedded on said carrier of the equipment item.

10. The airborne optronic equipment item as claimed in claim 1, also comprising an embedded data storage device in which said database is stored.

11. The airborne optronic equipment item as claimed in claim 1, wherein said data processor is configured or programmed to drive said or at least one said image sensor to acquire at least one said image of said region flown over according to a line of sight and with a field of view that are defined.

12. An airborne optronic equipment item for designating targets as claimed in claim 1.

13. A method implemented by an optronic equipment item as claimed in claim 1, comprising the following steps:
receiving, from a geolocation device, information on the position of the carrier of the equipment item or of another carrier, as well as information indicative of a line of sight of an image sensor embedded on this carrier;
accessing a database of images of said region flown over and extracting therefrom information making it possible to synthesize a virtual image corresponding to said line of sight and to an observation point having the same position as said carrier;
synthesizing said virtual image; and
transmitting said virtual image to a display device.

* * * * *